US007484084B1

(12) United States Patent
Ranaweera et al.

(10) Patent No.: US 7,484,084 B1
(45) Date of Patent: Jan. 27, 2009

(54) USE OF A BASEBOARD MANAGEMENT CONTROLLER TO FACILITATE INSTALLATION OF FIRMWARE IN A PROCESSING SYSTEM

(75) Inventors: Samantha L. Ranaweera, Cranberry Two, PA (US); Roger M. Blood, Allison Park, PA (US)

(73) Assignee: NetApp, Inc., Sunnyvale, CA (US)

( * ) Notice: Subject to any disclaimer, the term of this patent is extended or adjusted under 35 U.S.C. 154(b) by 456 days.

(21) Appl. No.: 11/314,058

(22) Filed: Dec. 20, 2005

(51) Int. Cl.
*G06F 9/00* (2006.01)
*G06F 9/24* (2006.01)
(52) U.S. Cl. ................. 713/1; 713/2; 713/100
(58) Field of Classification Search ........ 713/1
See application file for complete search history.

(56) References Cited

U.S. PATENT DOCUMENTS

| 6,732,267 | B1 | 5/2004 | Wu et al. | |
|---|---|---|---|---|
| 2004/0237082 | A1* | 11/2004 | Alcazar et al. | 717/174 |
| 2006/0174306 | A1* | 8/2006 | Kim et al. | 725/132 |
| 2007/0002730 | A1* | 1/2007 | Lu et al. | 370/216 |
| 2007/0094426 | A1* | 4/2007 | Chiang et al. | 710/73 |

OTHER PUBLICATIONS

"The Intelligent Platform Management Specification, Ver. 2.0", MegaNews, Mar. 2004, vol. 5, Issue 3, 1 page.
IPMI, "Intelligent Platform Management Interface Specification, Second Generation", Ver. 2.0, Document Revision 1.0, Feb. 12, 2004, pp. i, ii, 11-12, 29-31.
Amibios®8, Superior Reliability, Manageability and Connectivity, American Megatrends, Data Sheet and Figures, Jul. 26, 2005, 2 pages.
Amibios®8, Sep. 9, 2005, http://www.ami.com/amibios8/, 2 pages.
Wikipedia, the Free Encyclopedia, "Baseboard Management Controller", Sep. 6, 2005, http://en.wikipedia.org/wiki/Baseboard_management_controller, 1 page.

* cited by examiner

*Primary Examiner*—Thomas Lee
*Assistant Examiner*—Michael J Brown
(74) *Attorney, Agent, or Firm*—Perkins Coie LLP

(57) ABSTRACT

In a processing system that includes a baseboard management controller (BMC) and which has a plurality of modes of operation, including a startup mode, a shutdown mode, a basic input/output system (BIOS) recovery mode, and a normal operating mode, the BMC is used to facilitate installation of firmware in the processing system while the processing system is in any of the plurality of modes of operation.

32 Claims, 3 Drawing Sheets

USE OF A BASEBOARD MANAGEMENT CONTROLLER TO FACILITATE INSTALLATION OF FIRMWARE IN A PROCESSING SYSTEM

FIELD OF THE INVENTION

At least one embodiment of the present invention pertains to techniques for installing firmware in a processing system, and more particularly, to a technique for using a Baseboard Management Controller to facilitate installation of firmware in a processing system.

BACKGROUND

During the last few years, considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

Most server-class computer systems on the market today have system components that require a firmware image to make them operational. "Firmware" is software that is stored in a read-only memory (ROM) (which may be reprogrammable), such as a ROM, PROM, EPROM, EEPROM, etc. Some examples of such components that require firmware are BMCs, the system basic input/output system (BIOS), storage controllers (e.g., SCSI/SAS/Fibre Channel components), and network interface controllers (NICs). These firmware images typically reside in the system flash memory where the BIOS resides or in component-specific flash parts.

As with any software, these firmware images can become obsolete, can become corrupted or may contain bugs (the latter two cases can be collectively referred to as "faults"). Therefore, a method is needed to update firmware images in a computer system as and when necessary. In this context, firmware "update", firmware "download" and firmware "flashing" all have the same meaning and generally refer to a process in which a firmware image obtained from some distribution media, is placed permanently in some location in the motherboard or associated peripherals of the system.

A typical approach to updating firmware involves booting the machine being updated to a service operating system (OS), such as DOS or Linux. A standalone application that knows the software and hardware intricacies of flashing that particular firmware image is then run on that service OS, accepting a firmware image and flashing it. A significant disadvantage of using such a method is that it typically requires user intervention in the form of keyboard input and/or presentation of the image, possibly at the same location as the system being updated. In addition, the service operating system may not be the same as the one normally run on the hardware, forcing the normal function of the hardware to be interrupted. For certain types of systems, this would cause down time, which may be extremely undesirable, such as in enterprise class storage servers.

Another known approach to updating firmware involves using a technique known as Serial-over-LAN (SOL) to allow a BMC to communicate with a remote management application, to update the BIOS firmware of the host computer. With this approach, a serial port of the server is remapped so that all outgoing communications directed to that serial port are routed over the server's LAN interface. The BMC then uses the serial port to communicate with the remote application, via a LAN.

A disadvantage of this SOL technique is that it requires that someone set up a serial YMODEM host at the remote end of the network, which tends to be a relatively complex operation. Another disadvantage of the SOL technique is that firmware other than BIOS cannot be updated using SOL without a host OS operating normally on the system that is being updated (not in its startup or shutdown mode). Yet in certain situations, it may be desirable or necessary to install new firmware while the host OS is not operating normally (or at all), such as after a system crash. This may be the case if, for example, faulty firmware is what is causing the OS to crash. At the least, this technique may require a reboot of the host OS, which results in undesirable down time. In addition, it is believed that the SOL approach has been limited to updating BIOS firmware, not other types of firmware.

Therefore, what is needed is a technique to install firmware in a processing system, which overcomes these disadvantages.

SUMMARY OF THE INVENTION

The present invention includes a method of operating a processing system that includes a baseboard management controller (BMC) and has multiple modes of operation, including a basic input/output system (BIOS) recovery mode, a startup mode and a shutdown mode. The method includes using the BMC to facilitate installation of firmware in the processing system while the processing system is in the BIOS recovery mode, in the startup mode or in the shutdown mode.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
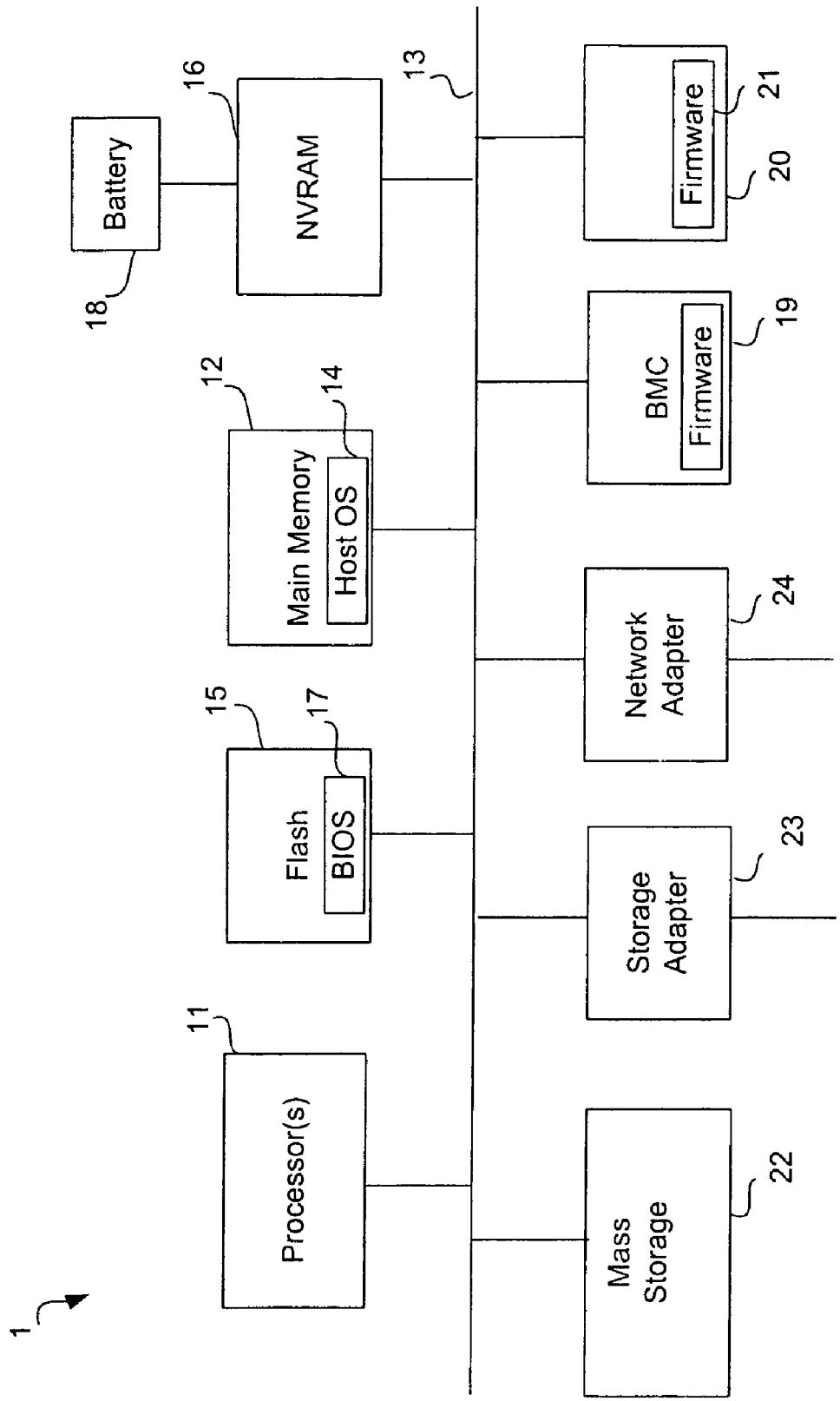
FIG. 1 is a high-level block diagram of a processing system in which the present invention can be implemented.

Methods and apparatus for using a BMC to facilitate installation of firmware in a processing system are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

As described further below, the technique introduced here can be applied in a storage server that provides multiple clients with access to data stored in an array of mass storage devices, via a network. The storage server includes a BMC, to facilitate installation of firmware in the storage server. Alternatively, the technique can be applied to facilitate installation of firmware in essentially any other type of computer or other processing system that includes a BMC. The technique does not rely upon the use of a serial port or the redirection of the serial port over the network, in contrast with the SOL approach.

As described further below, a processing system (e.g., a storage server) may include a BMC and an OS that has various modes of operation. These modes of operation of the OS may include, for example, a normal operating mode, a startup mode, a shutdown mode and a BIOS recovery mode. In accordance with the technique introduced here, the BMC can be used to facilitate installation of firmware in the processing system while the processing system is in any of those modes of operation. One approach is to make use of RAM available on the BMC to hold a firmware image on behalf of the process performing the firmware update.

Assuming the BMC does not have access to the main memory of the server and its own memory is limited, the BMC must at least temporarily store the new firmware image somewhere else, until the firmware is installed (flashed) into its final destination. The final destination can be any component of the server. If the NIC has some internal memory, the image can potentially be stored there. Alternatively, the firmware image can potentially be stored in memory within the BMC. The drawback in this method is that the amount of memory available in the NIC and the BMC is typically limited to a few kilobytes, whereas the size of some firmware programs, such as a system BIOS, may be a megabyte or more.

Therefore, according to the technique introduced here, the BMC is configured to cause a NIC in the server, upon receiving the new firmware image over a network, to perform direct memory access (DMA) transfers of the image into a local non-volatile random access memory (NVRAM) in the server (note that volatile RAM could alternatively be used for that purpose).

Even if the server's main memory can be used to hold the image, there are disadvantages. Consider the case of a BIOS update. At least a warm reboot is required to cause the BIOS to load the new image to its final destination. While this approach may work under most circumstances, if the central processing unit (CPU) of the server is hung, a hard reset may be required. In that case, one cannot trust the integrity of the firmware image that was held in the main memory. Unfortunately, some firmware updates are required when the system is in a crashed state, so relying on the warm reboot introduces a possible case where the method may not work.

If an OS is running when a firmware download is requested and a BMC driver is available for that OS, it is possible to have the BMC alert the OS driver that a new image is available, by using IMPI system events. When the driver detects such an event, it would inspect the image and perform the update itself. The drawback in this approach is that the OS has to be up and running for the download to work.

According to certain embodiments, the technique introduced here addresses the drawbacks of small memory availability in BMC and NIC, dependence on OS support and the requirement of a warm reboot, by placing the new firmware image in the NVRAM. The size of NVRAM (or RAM) can be in the range of Gigabytes (or more), so this resolves the memory size issue. Since memory content is backed up (e.g., by battery power) in the case of NVRAM, the image will not be lost even in the case of a power failure between the time the flash operation is initiated and the time it is actually carried out. A simple mechanism can guarantee that the image stays intact even in the case of a hard reset of the processor, thereby eliminating the need for a warm reboot. This approach can be used to facilitate installation of any type of firmware, not just BIOS or BMC firmware.

As mentioned above, the technique introduced here can be implemented in a storage server. An example of the architecture of such a storage server is illustrated at a high-level in FIG. 1 (certain standard and well-known components which are not germane to the present invention are not shown). If designed for use in a network attached storage (NAS) environment, the storage server 1 may be a file server, which is sometimes called a "filer" in that context. A filer-operates on behalf of one or more clients to store and manage shared files. The files may be stored in a storage subsystem that includes one or more arrays of mass storage devices (typically external to the storage server 1, but not necessarily), such as magnetic or optical disks or tapes, by using RAID (Redundant Array of Inexpensive Disks). Hence, the mass storage devices in each array may be organized into one or more separate RAID groups.

If designed for use in a SAN environment, the storage server 1 can provide clients with block-level access to stored data, rather than file-level access. Alternatively, the storage server 1 may be capable of providing clients with both file-level access and block-level access. Filers made by Network Appliance, Inc. (NetApp®) of Sunnyvale, Calif. have this capability.

As shown in FIG. 1, the storage server 1 includes one or more processors 11 coupled to a bus system 12. The bus system 13 in FIG. 1 is an abstraction that represents one or more physical buses and/or point-to-point connections, connected by appropriate bridges, adapters and/or controllers. The specific architecture and configuration of the bus system is not germane to the present invention and is well within the skill level of those of ordinary skill in the art. Nonetheless, it is noted that the bus system 13 might include, for example: a system bus (e.g., for communication between a processor and main memory); a Peripheral Component Interconnect (PCI) bus; a HyperTransport or industry standard architecture (ISA) bus; a small computer system interface (SCSI) bus; a universal serial bus (USB); an Institute of Electrical and Electronics Engineers (IEEE) standard 1394 bus (sometimes referred to as "Firewire"); an RS-232 bus; an Intelligent Platform Management Bus (IPMB); and/or an Inter-IC (I2C) bus.

The processors 11 are the CPUs of the storage server 1 and, thus, control the overall operation of the storage server 1. In certain embodiments, the processors 11 accomplish this by executing software stored in main memory 12. Main memory 12 is typically some form of RAM. The host OS 14 and application software of the storage server 1 normally execute from main memory 12. A processor 11 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 1 also includes flash memory 15 and NVRAM 16, both coupled to the bus system 13. The flash memory 15 contains the BIOS 17 of the storage server 1. The NVRAM 16 can be essentially any form of RAM and is made non-volatile by supplying it with backup power from a battery 18 or other backup power source.

Also connected to the processors 11 through the bus system 13 are a BMC 19 and one or more other components 20 of the storage server 1, each of which has its own independent firmware 21 to control its operation. The BMC 19 may be connected to all other components of the storage server 1 through one or more of, for example: an IPMB bus, a PCI-Express (PCI-E) bus, an I2C bus, an RS-232 bus, or other known type of interconnect (collectively illustrated in FIG. 1 in the form of bus system 13). Ways of connecting a BMC to other components in a computer system are well-known in the art.

Also connected to the processors 11 through the bus system 13 are a mass storage device 22, a storage adapter 23, and a network adapter 24. Mass storage device 22 may be or include any conventional medium for storing large quantities of data in a non-volatile manner, such as one or more disks. The storage adapter 23 allows the storage server 1 to access an external storage subsystem and may be, for example, a Fibre Channel adapter or a SCSI adapter. The network adapter 24 provides the storage server 1 with the ability to communicate with remote devices, such as clients, over a network and may be, for example, an Ethernet adapter or a Fibre Channel adapter.

Figure 2:
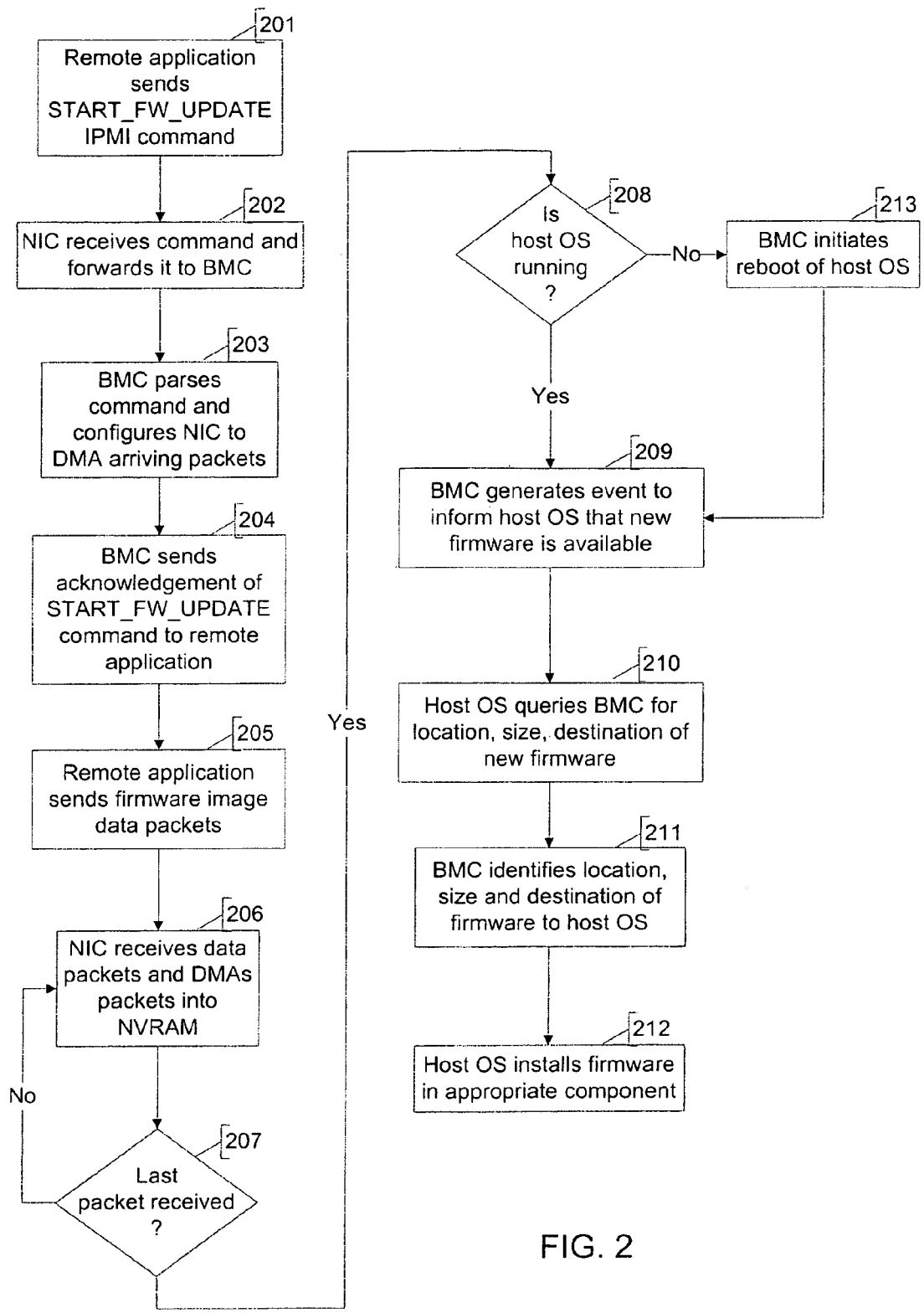
FIG. 2 is a flow diagram showing a process by which a BMC can be used to facilitate the installation of firmware in a processing system.

As noted above, the technique introduced here uses a BMC (e.g., BMC 19 in FIG. 1) to cause a NIC (e.g., the network adapter 24 in FIG. 1) to DMA a firmware image received over the network into NVRAM (e.g., NVRAM 16 in FIG. 1), prior to installation of the firmware into its final destination. The firmware can be the system BIOS, the BMC's firmware, or the firmware of any other component in the computer system. FIG. 2 illustrates an example of a process by which this can be done.

To initiate the firmware update process, at 201 a remote application sends an IPMI command, referred to herein as START_FW_UPDATE, to the storage server 1 over a network. Note that the term "update" is used here merely to facilitate description and is not limited to the strictly literal sense, i.e., installing a more recent version of existing firmware. Rather, "update" can also refer to, for example, the complete replacement of a firmware image, the installation of firmware for a component for which firmware was not previously installed, or the installation of a firmware patch to correct a bug or corrupted code.

At 202, the NIC receives the START_FW_UPDATE command and forwards it to the BMC. At 203 the BMC receives the START_FW_UPDATE command from the NIC, parses the command, and configures the NIC to DMA arriving packets into NVRAM. The BMC then sends an acknowledgement of the START_FW_UPDATE command to the remote application (via the NIC) at 204. At 205, in response to the acknowledgement, the remote application starts sending data packets containing portions of the firmware image to the storage server. The NIC receives data packets and DMAs the packets directly into NVRAM at 206. This process (205 and 206) continues until all packets representing the firmware image have been received (207).

Once all packets representing the firmware image have been received, at 208 the BMC determines whether the host OS is operating normally. The BMC may make this determination automatically, based on its own firmware programming. Alternatively, the BMC may do this in response to a specific (original equipment manufacturer) OEM-defined IPMI command received from the remote application at this point in the process (the IPMI standard has provisions for OEM-defined commands and extensions).

If the host operating system is not operating normally, then at 213 the BMC initiates a reboot of the host OS (in accordance with IPMI) and proceeds to 209. If the host OS is operating normally, then the process proceeds directly from 208 to 209. At 209, the BMC generates an IPMI event to inform the host OS that the firmware is available. The host OS, upon detecting the event, then queries the BMC for the specific location, size, and destination for the new firmware, at 210. The BMC identifies these parameters to the host OS at 211, in response to which the host OS installs the firmware into its appropriate components at 212.

Figure 3:
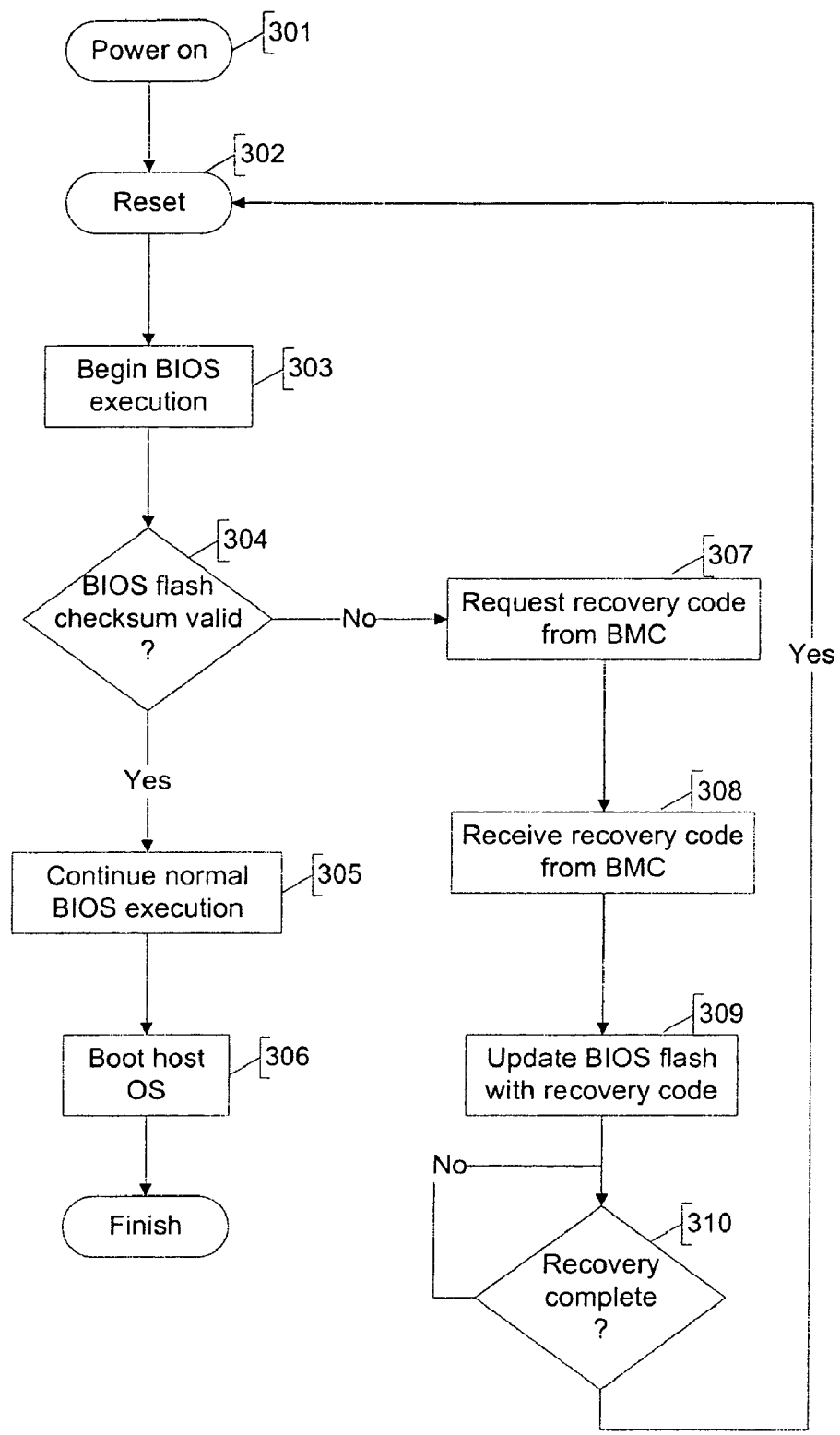
FIG. 3 is a flow diagram showing a process by which a BMC can be used to facilitate BIOS recovery in a processing system.

The above described technique can also be used to facilitate BIOS recovery in the event of corruption of the system BIOS of the storage server. FIG. 3 illustrates a BIOS recovery process which can be used in conjunction with the above-described technique. The process of FIG. 3 can be implemented in a small, write-protected portion of the BIOS code, executed by the CPU (e.g., processor(s) 11) of the storage server. In response to power being turned on at the storage server at 301, a system reset of the storage server is initiated at 302, which causes the CPU to begin executing the BIOS at 303. The BIOS code includes a checksum stored in flash, which can be used to determine whether the BIOS has become corrupted. The CPU therefore determines at 304 whether the BIOS checksum is valid. If the BIOS checksum is valid, the CPU continues normal execution of the BIOS at 305, after which the host OS is booted at 306.

If the BIOS checksum is not valid, then the process branches to 307, at which the CPU requests BIOS recovery code from the BMC. The request is generated and sent in conformance with IPMI. The BIOS recovery code is a predetermined set of code that is used to perform recovery when the BIOS has become corrupted. The BIOS recovery code may be stored within internal memory of the BMC, if that memory is large enough to contain the recovery code. Otherwise, the BMC can be preconfigured (in its firmware) to automatically obtain the BIOS recovery code from a pre-specified location, such as a remote web site or an external storage device, in response to this request. Accordingly, the BIOS recovery code is received by the CPU from the BMC at 308 and used to update the corrupted BIOS code stored in flash at 309. Once the recovery process is complete (310), the process loops back to 302, where a system reset is again performed.

In addition to the BMC providing the new BIOS image directly, it is possible for the BMC to place a new BIOS image in NVRAM, reboot the machine, and then inform the BIOS at bootup that a new image is available there.

Thus, methods and apparatus for using a BMC to facilitate installation of firmware in a processing system have been described.

Software and/or firmware to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, hardwired circuitry, programmable circuitry, software, or any combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    operating a processing system which has a plurality of modes of operation, including at least one of a basic input/output system (BIOS) recovery mode, a startup mode or a shutdown mode;
    using a memory to store firmware, wherein the memory is not part of the main memory of the Processing system; and
    using a baseboard management controller (BMC) in the processing system to facilitate installation of the firmware from the memory to the processing system while the processing system is in a particular operating mode, wherein the particular operating mode is the BIOS recovery mode, the startup mode or the shutdown mode.

2. A method as recited in claim 1, wherein the particular operating mode is the BIOS recovery mode.

3. A method as recited in claim 1, wherein the particular operating mode is the startup mode.

4. A method as recited in claim 1, wherein the particular operating mode is the shutdown mode.

5. A method as recited in claim 1, wherein using the BMC to facilitate installation of firmware in the processing system comprises:
    using the BMC to facilitate an update of firmware in the processing system.

6. A method as recited in claim 1, wherein the firmware comprises BIOS firmware, and wherein using the BMC to facilitate installation of firmware in the processing system comprises:
    using the BMC to facilitate BIOS recovery in response to a fault in BIOS firmware in the processing system.

7. A method as recited in claim 6, wherein using the BMC to facilitate BIOS recovery comprises:
    using the BMC to obtain a BIOS firmware image from a remote system, without using any serial port of the processing system.

8. A method as recited in claim 1, wherein the firmware comprises firmware of a type other than BIOS firmware.

9. A method as recited in claim 1, wherein using the BMC to facilitate installation of firmware in the processing system comprises:
    using the BMC to obtain the firmware from a remote system without using any serial port of the processing system.

10. A method as recited in claim 1, wherein the memory comprises non-volatile random access memory (NVRAM), and wherein the method further comprises:
    using the BMC to control transfer of the firmware from a remote system, via a network, into the NVRAM.

11. A method as recited in claim 10, wherein the processing system further includes a network interface device, and wherein using the BMC to control transfer of the firmware from the remote system into the NVRAM comprises:
    using the BMC to cause the network interface device to perform one or more direct memory access (DMA) transfers to transfer the firmware into the NVRAM.

12. A method as recited in claim 1, further comprising storing at least a portion of the firmware in a memory within the BMC.

13. A method as recited in claim 1, wherein using the BMC to facilitate installation of firmware in the processing system comprises:
    using the BMC to obtain the firmware from a remote web site.

14. A method as recited in claim 1, wherein the processing system includes an operating system, and wherein using the BMC to facilitate installation of firmware in the processing system comprises:
    using the BMC to facilitate installation of the firmware in the processing system while the operating system is in a normal operating mode, such that no reboot of the operating system is required to complete the installation of the firmware.

15. A method of installing firmware in a processing system that includes a baseboard management controller (BMC), a network interface device, and a non-volatile random access memory (NVRAM), the method comprising:
    receiving the firmware at the network interface device from a network;
    using the BMC to cause the network interface to perform direct memory access (DMA) transfers of the firmware into the NVRAM, wherein the NVRAM is not part of the main memory of the Processing system; and
    storing the firmware in the NVRAM for subsequent installation in the processing system.

16. A method as recited in claim 15, further comprising installing the firmware in the processing system from the NVRAM.

17. A method as recited in claim 15, wherein the processing system is a storage server configured to provide a plurality of clients with access to data stored in a plurality of storage devices.

18. A processing system comprising:
    a processor;
    a system memory coupled to the processor;
    a network interface device coupled to the processor;
    a non-volatile random access memory (NVRAM) coupled to the processor;
    an operating system; and
    a baseboard management controller (BMC) coupled to the processor and configured to facilitate installation of firmware in the processing system by causing the network interface to perform direct memory access (DMA) transfers of the firmware into the NVRAM; wherein the NVRAM is not part of the main memory of the processing system, and further wherein the NVRAM stores the firmware for subsequent installation in the Processing system.

19. A processing system as recited in claim 18, wherein the processing system includes an operating system that has a startup mode, a shutdown mode, and a basic input/output system (BIOS) recovery mode, and wherein the BMC is configured to facilitate installation of firmware in the processing system while the processing system is in any of the startup mode, the shutdown mode, or the BIOS recovery mode.

20. A processing system as recited in claim 19, wherein no reboot of the processing system is necessary before the processing system can begin using the firmware, if the operating system is in the normal operating mode when the firmware is installed.

21. A processing system as recited in claim 18, wherein the operating system configures the processing system as a storage server to provide a plurality of clients with access to data stored in a plurality of storage devices, the processing system further comprising:

a storage interface through which to communicate with the plurality of storage devices.

22. A processing system as recited in claim 18, wherein the BMC is configured to obtain the firmware from a remote system without using any serial port of the processing system.

23. A processing system as recited in claim 18, wherein the BMC is configured to obtain the firmware from a remote web site.

24. A processing system comprising:

a processor;

a memory coupled to the processor, wherein the memory is not part of the processing system's main memory, and wherein the memory stores firmware for subsequent installation in the Processing system;

an operating system; and a baseboard management controller (BMC) coupled to the processor, wherein the processing system has a plurality of modes of operation, the plurality of modes of operation including a startup mode, a shutdown mode, a basic input/output system (BIOS) recovery mode, and a normal operating mode of the operating system, and wherein the BMC is configured to facilitate installation of the firmware from the memory to the processing system while the processing system is in any of the plurality of modes of operation.

25. A processing system as recited in claim 24, wherein the processing system is a storage server to provide a plurality of clients with access to data stored in a plurality of storage devices, the processing system further comprising:

a storage interface through which to communicate with the plurality of storage devices.

26. A processing system as recited in claim 24, wherein the BMC is configured to facilitate an update of firmware in the processing system.

27. A processing system as recited in claim 24, wherein the BMC is configured to facilitate BIOS recovery.

28. A processing system as recited in claim 27, wherein the BMC is configured to obtain the BIOS firmware from a remote system without using any serial port of the processing system.

29. A processing system as recited in claim 27, wherein the BMC is configured to obtain the firmware from a remote system without using any serial port of the processing system.

30. A processing system as recited in claim 24, wherein the BMC is configured to store at least a portion of the firmware within the BMC.

31. A processing system as recited in claim 24, wherein the BMC is configured to obtain the firmware from a remote web site.

32. A processing system as recited in claim 24, wherein the BMC is configured to facilitate installation of the firmware in the processing system while the operating system is in a normal operating mode, such that a reboot of the operating system is not required to complete the installation of the firmware.

* * * * *